United States Patent Office 3,326,891
Patented June 20, 1967

3,326,891
LINCOMYCIN ACYLATES
Herman Hoeksema, Cooper Township, Kalamazoo County, and Ross R. Herr and Brian Bannister, Kalamazoo, Mich., assignors to The Upjohn Company, Kalamazoo, Mich., a corporation of Delaware
No Drawing. Filed Apr. 13, 1964, Ser. No. 359,425
10 Claims. (Cl. 260—210)

ABSTRACT OF THE DISCLOSURE

Lincomycin acylates having the following formula:

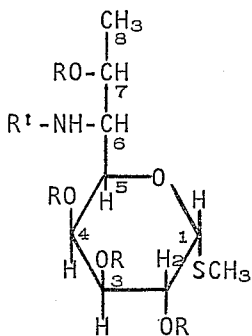

wherein R' is trans-4-propyl-L-hygroyl and R is selected from the group consisting of hydrogen and acyl, and at least one R is acyl, said acyl advantageously being the acyl of a hydrocarbon carboxylic acid containing not more than 12 carbon atoms or a halo-, nitro-, hydroxy-, amino-, cyano-, thiocyano-, and lower alkoxyhydrocarbon carboxylic acid of not more than 12 carbon atoms. These lincomycin acylates can be used at antibacterial agents, for example, to inhibit the growth of *Staphylococcus albus* on various dental and medical equipment contaminated with this bacteria.

---

This invention relates to novel derivatives of the antibiotic lincomycin and to processes for the preparation thereof, and is particularly directed to lincomycin acylates and to a process for producing them by the direct acylation of lincomycin.

Lincomycin is an antibiotic obtained as an elaboration product of a lincomycin-producing actinomycete. Methods for the production, recovery and purification of lincomycin are described in U.S. Patent 3,086,912.

It has now been found according to this invention that novel compounds are obtained by direct acylation of lincomycin. It has been found according to this invention that lincomycin contains four acylatable hydroxyl groups and that according to the extent of the acylation mono-, di-, tri-, and tetraacylates can be obtained. Subsequent to this invention, the structure of lincomycin has been elucidated. The novel compounds of the invention, therefore, can now be represented by the following formula:

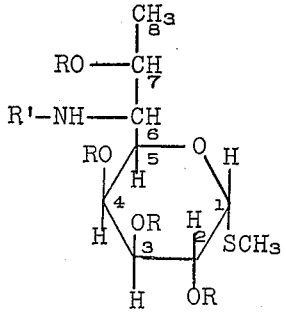

I wherein R' is trans-4-propyl-L-hygroyl and R is selected from the group consisting of hydrogen and acyl, and at least one R is acyl, said acyl advantageously being the acyl of a hydrocarbon carboxylic acid containing not more than twelve carbon atoms or a halo-, nitro-, hydroxy-, amino-, cyano-, thiocyano-, and lower alkoxyhydrocarbon carboxylic acid of not more than twelve carbon atoms. Suitable hydrocarbon carboxylic acids include (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, acrylic, crotonic, undecylenic, hexynoic, heptynoic, octynoic acids and the like; (b) saturated or unsaturated, substituted, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid and the like; (c) saturated or unsaturated, substituted, alicyclic aliphatic carboxylic acids, for example, cyclopentaneacetic acid, cyclopentanepropionic acid, cyclopenteneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid and the like; and (e) aromatic-aliphatic carboxylic acids, for example, phenylacetic acid, phenylproprionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids of not more than twelve carbon atoms include hydrocarbon carboxylic acids as given above which are substituted by one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, and isomeric forms thereof. Eamples of such substituted hydrocarbon carboxylic acids are mono-, di-, and tri-chloracetic acid; α, and β-chloropropionic acid; α- and γ-bromobutyric acid; α- and δ-iodovaleric acid; mevalonic acid; 2- and 4-chlorocyclohexanecarboxylic acid; shikimic acid; 2-nitro-1-methylcyclobutanecarboxylic acid; 1,2,3,4,5,6-hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4, 5-dibromo-2-methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo-3,5-dimethylcyclohexanecarboxylic acid; homogentisic acid, o-, m-, and p-chlorobenzoic acid; anisic acid; salicyclic acid; p-hydroxybenzoic acid; β-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2, 4,6-trinitrobenzoic acid; thiocyanoacetic acid; cyanopropionic acid; lactic acid; ethoxyformic acid (ethyl hydrogen carbonate); and the like.

The novel acylates of lincomycin can be used to upgrade lincomycin; thus, by acylating crude lincomycin, purifying the acylate, thereby separating it from nonacylatable and other impurities, and deacylating it to lincomycin, the lincomycin is upgraded. The deacylation is readily accomplished by reacting the acylates with dilute aqueous base at 15–80° C., or with ammonia in methanol at 15–40° C.

Further, the novel acylates of lincomycin can be used as antibacterial agents. For example, lincomycin tetraacetate inhibits the growth of *Staphylococcus albus*, and, therefore, is useful as a disinfectant on various dental and medical equipment contaminated with this organism. The monoacylates of lincomycin are valuable antibacterial agents. For example, lincomycin monoacetates inhibit the growth of *Staphylococcus aureaus*, and, therefore, are useful as disinfectants on washed and stacked food utensils contaminated with this organism. The novel tetraacylate of lincomycin can be used as an intermediate to make lincomycin mono-, di-, and triacylates as hereinafter shown. Further, lincomycin diacylates and tetraacylates are valuable in promoting the growth of chicks. For example, the use of chick feed containing 4 mg. of lincomycin tetraacetate hydrochloride over a period of 14 days gave a 14% increase in growth in the chicks so fed over a control group of chicks. In the same test program, lincomycin dibenzoate hydrochloride gave a 17% increase in growth.

The novel acylates of lincomycin on hydrolysis, e.g., by refluxing in 6 N hydrochloric acid for 5 hours or in hydrazine for 20 hours, give trans-4-propyl-L-hygric acid and the hydrazide of trans-4-propyl-L-hygric acid, respectively. The former is useful as a buffering agent or antacid or, in the form of its fluosilicic acid addition salt as a moth-proofing agent.

The novel compounds of the invention can be prepared from lincomycin be reacting lincomycin with the halide or anhydride of the selected carboxylic acid in the presence of an acid-binding agent, for example, a tertiary amine. Suitable acid-binding agents include heterocyclic amines such as pyridine, quinoline and isoquinoline; trialkylamines such as trimethylamine, triethylamine, triisopropylamine and the like; N,N-dialkylanilines such as dimethylaniline, diethylaniline and the like; and N-alkyl-piperidines such as N-ethylpiperidine, N-methylpiperidine and the like. The preferred base is pyridine. The reaction is advantageously conducted by treating a suspension of lincomycin in the tertiary amine with the acid halide or anhydride and heating the resulting mixture, if desired, for a short period at a temperature not greater than about 100° C. to complete the reaction. The resulting ester can be isolated by conventional procedures. Upon reacting lincomycin in pyridine with at least 4 moles of acylating agent, there is obtained lincomycin tetraacylate. When the molar ratio of acid halide or anhydride to lincomycin is less than 4:1 the reaction product normally will be a mixture of partially acylated compounds (i.e., mono-, di-, and triacylates). Such mixtures can be separated into their component parts by conventional procedures, for example, using counter current distribution procedures or partition chromatography.

Lincomycin mono-, di-, and triacylates can also be prepared by first forming the tetraacylate and then deacylating it by acidic hydrolysis. Again, separation of a mixture of acylates can be achieved by methods disclosed above. The procedure which was discovered by a co-investigator is the best one known for producing the triacylates. By subjecting lincomycin tetraacylate to acid hydrolysis until substantial conversion to lincomycin triacylate is obtained, a high yield of the triacylate, in comparison to that of mono- and diacylates, is obtained. If desired, the lincomycin tetraacylate can be deacylated directly to the mono- or diacylates by extending the hydrolysis time.

Salts of lincomycin acylates can be made by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methyl glutaric, ortho-sulfobenzoic, cyclohexanesulfamic, cyclopentanepropionic, 1,2 - cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric and like acids.

Salts of lincomycin acylates of this invention can be used for the same purposes as the free base. They can also be used to upgrade the free base, thus by making an acid addition salt of the free base, subjecting it to purification procedures, and then converting the salt back to the free base by neutralizing with an alkali or by contacting with an anionic resin, advantageously to about pH 7.5 to 8.5, the free base is upgraded.

The following examples are illustrative of the process and products of the present invention, but are not to be construed as limiting.

EXAMPLE 1

*Lincomycin tetraacetate hydrochloride*

To a solution of 2 g. of lincomycin in 10 ml. of pyridine was added 3 ml. acetic anhydride. The mixture was heated 6 hours on the steam bath, cooled to room temperature, stirred 1 hour with 1 ml. of water and evaporated to a thick syrup. The syrup was dissolved in 10 ml. of ethyl acetate, and the solution was washed with 10 ml. of ice-cold 5% sodium bicarbonate solution, then 3 times with 1 vol. portions of water, dried over anhydrous sodium sulfate and evaporated on a rotary evaporator to dryness. The residue was dried overnight in a vacuum desiccator, dissolved in 75 ml. of anhydrous ether and treated with dry hydrogen chloride while cooling in ice until no further granular precipitate formed. The precipitate was immediately filtered, washed 3 times with 50 ml. portions of dry ether and dried in vacuo. It was dissolved in 30 ml. of chloroform and the solution was evaporated to 8 ml. on a steam bath. The addition of about 50 ml. of ether to the warm solution resulted in the crystallization of lincomycin tetraacetate hydrochloride having a melting point of 226–233° C.; an optical rotation $[\alpha]_D^{25} = +149°$ (c., 1 in $H_2O$); and the following elemental analysis:

Calculated for: $C_{26}H_{42}N_2O_{10}S \cdot HCl \cdot 1/2H_2O$: C, 50.35; H, 7.15; N, 4.52; O, 27.09; S, 5.17; Cl, 5.72; Eq. wt., 620; $H_2O$ 1.45; acetyl 27.8. Found: C, 49.83; H, 7.57; N, 4.52; O, 27.10; S, 4.99; Cl, 5.81; Eq. wt., 605; $H_2O$, 1.72; acetyl 25.53.

Lincomycin tetraacetate hydrochloride can be converted to lincomycin tetraacetate by treatment with a strongly basic anion exchange resin. [Suitable anion exchange resins for this purpose are obtained by chlormethylating by the procedure given on pages 88 and 97 of Kunin, Ion Exchange Resins, 2nd ed. (1958), John Wiley and Sons, Inc., polystyrene crosslinked, if desired, with divinylbenzene prepared by the procedure given on page 84 of Kunin, supra, and quaternizing with trimethylamine, or dimethylethanolamine by the procedure given on page 97 of Kunin, supra. Anion exchange resins of this type are marketed under the trade names Dowex 2, Dowex 20, Amberlite IRA–400, Duolite A–102, and Permutit S–1.] The lincomycin tetraacetate can then be converted to other salts by contacting with other acids as previously disclosed.

EXAMPLE 2

*Lincomycin tetrabenzoate hydrochlorite*

To a solution of 203.3 gm. of lincomycin in 2.5 liters of pyridine in a 5 liter flask at 10° C. was added 344 ml. of benzoyl chloride during a 15 minute period with good stirring. The reaction mixture was stirred and cooled for an additional half hour and then allowed to stand at room temperature overnight. The reaction mixture was stirred and heated on a steam bath for 15 minutes, cooled to 25° C., and slowly poured into 18 liters of deionized water with good stirring. The aqueous phase was decanted and discarded. The crude gummy residue of lincomycin tetrabenzoate was washed with 18 liters of water, dissolved in 10 liters of benzene, and the solution was washed 2 times with 6 liter portions of water. To the benzene solution of lincomycin tetrabenzoate was added 500 ml. of concentrated hydrochloric acid diluted with 2.5 liters of water. The two-phase mixture was stirred thoroughly and 40 liters of Skellysolve B (isomeric hexanes) was slowly added to precipitate lincomycin tetrabenzoate hydrochloride. After stirring for 1 hour, the mixture was vacuum filtered and the product was washed with water and benzene-Skellysolve B, (1–4 mixture) and vacuum dried overnight at 50° C.; yield, 429.7 gm. of lincomycin tetrabenzoate hydrochloride. The product was recrystallized by dissolving in 15.2 liters of refluxing benzene, adding 50 gm. of decolorizing carbon, vacuum filtering through diatomaceous earth, and diluting the filtrate by slowly adding 17 liters of Skellysolve B (isomeric hexanes) with good stirring. The solids were collected and vacuum dried as above; yield, 410 gm. of lincomycin tetrabenzoate hydrochloride. A further recrystallization using 12.3 liters of benzene, 50 gm. of decolorizing carbon and 16 liters of Skellysolve B yielded 398 gm. of lincomycin tetrabenzoate hydrochloride having the following elemental analysis:

*Analysis.*—Calcd. for $C_{46}H_{50}N_2O_{10}S \cdot HCl$: C, 64.28; H, 5.98; N, 3.26; S, 3.73; Cl, 4.12. Found: C, 64.04; H, 6.11; N, 3.25; S, 4.14; Cl, 4.08–4.25.

Treatment of the hydrochloride with a strongly basic anion exchange resin (prepared as previously described) gives the free base which can be converted to other salt forms by contacting with other acids as previously disclosed.

EXAMPLE 3

By substituting the acetic anhydride in Example 1 by propionic, succinic, maleic, and phthalic anhydride, there are obtained lincomycin tetrapropionate, (hydrogensuccinate), (hydrogenmaleate), and (hydrogenphthalate).

EXAMPLE 4

By substituting the acetic anhydride in Example 1 by acetyl chloride, propionyl bromide, butyryl chloride, valeryl chloride, caproyl chloride, heptanoyl chloride, and caprylyl chloride, and the pyridine by at least a stoichiometric amount of triethylamine, there are obtained lincomycin tetraacetate, -propionate, -butyrate, -valerate, -caproate, -heptanoate, and -caprylate.

EXAMPLE 5

By substituting the benzoyl chloride in Example 2 by propionyl chloride, isobutyryl chloride, valeryl chloride, isovalyeryl chloride, neopentylacetyl chloride, hexanoyl chloride, heptanoyl chloride, phenylacetyl chloride, toluoyl chloride, cyclopentanepropionyl chloride, 1-cyclopentene-1-propionyl chloride, cyclohexaneacetyl chloride, acrylyl chloride, crotonyl chloride, 2-hexynoyl chloride, 2-octynoyl chloride, chloroacetyl bromide, p-chlorobenzoyl chloride, anisoyl chloride, salicyloyl bromide, p-nitrobenzoyl chloride, and cyanoacetyl chloride, there are obtained lincomycin tetrapropionate, -isobutyrate, -valerate, -isovalerate, -neopentylacetate, -hexanoate, -heptanoate, -phenylacetate, -toluate, -cyclopentanepropionate, 1-cyclopentene-1-propionate, -cyclohexaneacetate, -acrylate, -crotonate, -2-hexynoate, -2-octynoate, -chloroacetate, -p-chlorobenzoate, -anisate, -salicylate, -p-nitrobenzoate, and -cyanoacetate, respectively, as the hydrochloride salt.

EXAMPLE 6

*Lincomycin acetate I and acetate II*

To 9.26 gm. (0.022 mole) of lincomycin base hemihydrate in 100 ml. pyridine at 5° C. was slowly added 3 ml. (0.032 mole) of acetic anhydride. The mixture was permitted to slowly return to room temperature and after standing overnight, it was evaporated to dryness under reduced pressure, and the residue was dissolved in 100 ml. of ethyl acetate. The solution was washed successively with 100 ml. of cold sodium bicarbonate solution and three 50-ml. volumes of water, dried and evaporated to dryness. The product (7 gm.) was distributed in a countercurrent distribution apparatus, using the system ethyl acetate:cyclohexane:95% ethanol:water (27:23:30:20). After 500 transfers, small amounts of lincomycin triacetate and lincomycin were removed, and the distribution was continued for a total of 1000 transfers. All four monoacetates were present but only two were separated as pure materials.

One, designated as lincomycin acetate I, has a K value of 0.27 and an optical rotation of $[\alpha]_D^{25}=+161°$ (c., 1, in chloroform).

*Analysis.*—Calcd. for $C_{20}H_{36}N_2O_7S$: C, 53.55; H, 8.09; N, 6.25; S, 7.15. Found: C, 52.64; H, 7.89; N, 6.12; S, 8.63.

The other, designated as lincomycin acetate II, has a K value of 0.43 and an optical rotation of $[\alpha]_D^{25}=+167°$ (c., 1, in chloroform).

*Analysis.*—Calcd. for $C_{20}H_{36}N_2O_7S$: C, 53.55; H, 8.09; N, 6.25; S, 7.15. Found: C, 53.43; H, 8.25; N, 6.55; S, 7.30.

Lincomycin acetate I is believed to be the 2-O-acetate and lincomycin acetate II the 7-O-acetate. In any event one is the 2-O-acetate and the other the 7-O-acetate.

EXAMPLE 7

By substituting the acetic anhydride in Example 6 by propionic, succinic, maleic, and phthalic anhydride there are obtained the corresponding lincomycin propionates, -hydrogensuccinates, -hydrogenmaleates, and -hydrogenphthalates.

EXAMPLE 8

By substituting the acetic anhydride in Example 6 by acetyl chloride, propionyl bromide, butyryl chloride, valeryl chloride, hexanoyl chloride, heptanoyl chloride, and octanoyl chloride, and the pyridine by at least a stoichiometric amount of triethylamine, there are obtained the corresponding lincomycin acetates, -propionate, -butyrates, -valerates, -hexanoates, -heptanoates, and octanoates.

EXAMPLE 9

(A) *Lincomycin triacetate.*—A solution of 5 gm. of lincomycin tetraacetate hydrochloride, prepared as in Example 1, in 50 ml. of 1 N hydrochloric acid and 2 ml. of ethanol, was stored 4 hours at room temperature. The solution was adjusted to pH 8 with 6 N sodium hydroxide and extracted three times with 50 ml. portions of chloroform. The extract was washed with water, dried over magnesium sulfate, and evaporated to dryness, yielding 3.4 gm. of syrupy material. This material was distributed in a counter-current distribution system consisting of ethyl acetate:cyclohexane:95% ethanol:water (27:23:30:20) for a total of 500 transfers. A peak fraction, K=1.67, was isolated from tubes 300–345 by evaporation of the solvent and freeze-drying; yield, 480 mg. of lincomycin triacetate.

*Analysis.*—Calcd. for $C_{24}H_{40}N_2O_9S$: C, 54.12; H, 7.57; N, 5.26; S, 6.02. Found: C, 53.90; H, 7.90; N, 4.99; S, 5.94.

(B) *Lincomycin tribenzoate.*—By substituting lincomycin tetraacetate hydrochloride in Part A, by lincomycin tetrabenzoate hydrochloride, as obtained in Example 2, there is obtained lincomycin tribenzoate.

EXAMPLE 10

The corresponding lincomycin tetraacylates are obtained by substituting the benzoyl chloride in Example 2 by acid halides or anhydrides of the acids following:

cyclobutanecarboxylic acid,
cyclopentanecarboxylic acid,
$\Delta_3$-cyclopentenecarboxylic acid, 2-methyl-3-cyclopentene-1-carboxylic acid,
cyclohexanecarboxylic acid,
2,6-dimethyl-3-cyclohexane-1-carboxylic acid,
3,4-dipropylcyclohexanecarboxylic acid,
cyclopentaneacetic acid,
3-cyclopentylpropionic acid,
4-cyclohexylbutyric acid,
(2-methylcyclohexyl)acetic acid,
p-ethylbenzoic acid,
p-isobutylbenzoic acid,
3-methyl-4-butylbenzoic acid,
3-phenylpropionic acid,
5-phenylvaleric acid,
cinnamic acid,
3-phenylpropiolic acid,
(1-naphthyl)acetic acid,
mono-, di-, and tri-chloroacetic acid,
α- and β-chloropropionic acid,
α- and γ-bromobutyric acid,
α- and δ-iodovaleric acid,
mevalonic acid,
2- and 4-chlorocyclohexanecarboxylic acid,
shikimic acid,
2-nitro-1-methyl-cyclobutanecarboxylic acid,
1,2,3,4,5,6-hexachlorocyclohexanecarboxylic acid,
3-bromo-2-methylcyclohexanecarboxylic acid,
4- and 5-bromo-2-methylcyclohexanecarboxylic acid,
5- and 6-bromo-2-methylcyclohexanecarboxylic acid,
2,3-dibromo-2-methylcyclohexanecarboxylic acid,
2,5-dibromo-2-methylcyclohexanecarboxylic acid,
4,5-dibromo-2-methylcyclohexanecarboxylic acid,
5,6-dibromo-2-methylcyclohexanecarboxylic acid,
3-bromo-3-methylcyclohexanecarboxylic acid,
6-bromo-3-methylcyclohexanecarboxylic acid,
1,6-dibromo-3-methylcyclohexanecarboxylic acid,
2-bromo-4-methylcyclohexanecarboxylic acid,
1,2-dibromo-4-methylcyclohexanecarboxylic acid,
3-bromo-2,2,3-trimethylcyclopentanecarboxylic acid,
1-bromo-3,5-dimethylcyclohexanecarboxylic acid, homogentisic acid, o-, m-, and p-chlorobenzoic acid, anisic acid, salicyclic acid, p-hydroxybenzoic acid, β-resorcylic acid, gallic acid, veratric acid, trimethoxybenzoic acid, trimethoxycinnamic acid, 4,4-dichlorobenzilic acid, o-, m-, and p-nitrobenzoic acid, cyanoacetic acid, 3,4- and 3,5-dinitrobenzoic acid, 2,4,6-trinitrobenzoic acid, thiocyanoacetic acid, cyanopropionic acid, lactic acid, ethoxyformic acid (ethyl hydrogen carbonate) and the like.

EXAMPLE 11

The corresponding lincomycin triacylates are obtained by substituting the lincomycin tetraacetate in Example 9 by the lincomycin tetraacylates obtained in Example 10.

EXAMPLE 12

The corresponding lincomycin acylates are obtained by substituting the acetic anhydride and pyridine in Example 6 by a stoichiometric amount of triethylamine and acid halides or anhydrides of the acids given in Example 10.

EXAMPLE 13

*Lincomycin dibenzoate hydrochloride*

In a dry 1-liter flask were placed 60 ml. of dry tetrahydrofuran, 4.7 gm. (0.0385 mole) of benzoic acid and 6.2 gm. (0.0385 mole) of 1,1′-carbonyldiimidazole. When evolution of carbon dioxide ceased (about 1 hour), 2.0 gm. (0.0049 mole) of lincomycin and 0.6 ml. of a solution of 25% sodium methoxide in methanol was added. After standing at 25° C. for 18 hours under a nitrogen atmosphere, the solvent was evaporated under vacuum. The remaining oil (5.7 gm.) was dissolved in about 20 ml. of methylene chloride and then added to 600 gm. of Florisil (a synthetic silicate of the type described in U.S. Patent 2,393,625 and sold by the Floridin Company) in Skellysolve B (isomeric hexanes). The column was developed by gradiently mixing and eluting with the following solvent combinations (600 ml. fractions were collected):

|  | Reservoir A | Reservoir B |
|---|---|---|
|  | Skellysolve B: EtOAc | Skellysolve B: EtOAc:MeOH |
| Fractions 1–20 | 90:10 | 72:8:20 |

After evaporation of the solvent all fractions were analyzed by thin layer chromatography (on silica gel in a methyl ethyl ketone, acetone, water system 75:25:10). Fractions 6 thru 9 which contained 1.1 gm. of a mixture of products free of starting materials were combined, dissolved in 10 ml. of methylene chloride, and poured onto a column of 100 gm. of Florisil in Skellysolve B. The column was developed by gradiently mixing and eluting with the following solvent combinations (100 ml. fractions were collected):

|  | Reservoir A | Reservoir B |
|---|---|---|
|  | Skellysolve B: EtOAc | Skellysolve B: EtOAc:MeOH |
| Fractions 1–20 | 90:10 | 87:8:5 |
| 21–27 |  | 87:8:5 |

Fractions 18 and 19 yielded 280 mg. of lincomycin dibenzoate which was converted to the hydrochloride and recrystallized from isopropanol-ethyl acetate; M.P., 231–233° C.; $[\alpha]_D^{25}$ in EtOH = +155° (c.=0.870).

*Analysis.*—Calcd. for $C_{32}H_{42}N_2O_8S \cdot HCl$: C, 59.02; H, 6.66; N, 4.30; Cl, 5.45; S, 4.92. Found: C, 58.90; H, 6.79; N, 4.49; Cl, 5.42; S, 5.11.

*S. aureus* infected mice were protected subcutaneously with a $CD_{50}$ of 122 (61–183) mg./kg. of lincomycin dibenzoate hydrochloride.

We claim:
1. A compound selected from the group consisting of the free bases and acid addition salts of a compound of the formula:

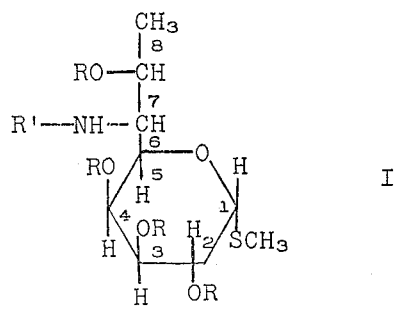

wherein R is selected from the group consisting of hydrocarbon carboxylic acid acyl of not more than 12 carbon atoms, or a halo-, nitro-, hydroxy-, amino-, cyano-, thiocyano-, and loweralkoxy hydrocarbon carboxylic acid acyl of not more than twelve carbon atoms; and R′ is trans-4-propyl-L-hygroyl.

2. A compound selected from the group consisting of the free bases and acid addition salts of a compound of the formula:

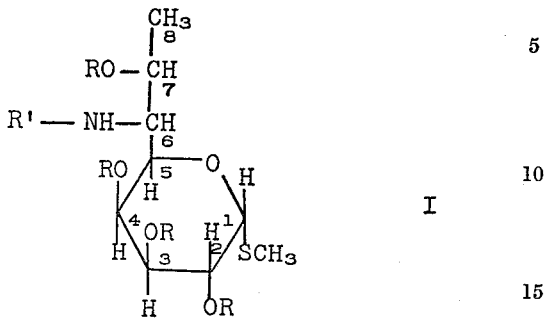

wherein R is hydrogen, at least one of which is replaced by an acyl selected from the group consisting of hydrocarbon carboxylic acid acyl of not more than 12 carbon atoms, or a halo-, nitro-, hydroxy-, amino-, cyano-, thiocyano-, and loweralkoxy hydrocarbon carboxylic acid acyl of not more than twelve carbon atoms; and wherein R' is trans-4-propyl-L-hygroyl.

3. A compound selected from the group consisting of the free bases and acid addition salts of a compound of the formula:

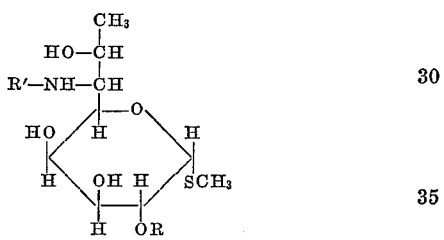

wherein R' is trans-4-propyl-L-hygroyl and R is selected from the group consisting of hydrocarbon carboxylic acid acyl of not more than twelve carbon atoms or a halo-, nitro-, hydroxy-, amino-, cyano-, thiocyano-, and loweralkoxy-hydrocarbon carboxylic acid acyl of not more than twelve carbon atoms, inclusive.

4. A compound selected from the group consisting of the free bases and acid addition salts of a compound of the formula:

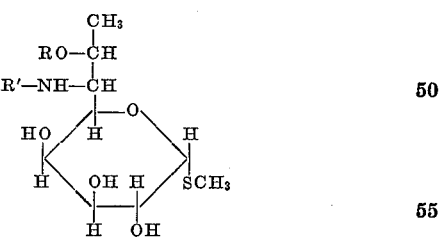

wherein $R_2$ is trans-4-propyl-L-hygroyl and R is selected from the group consisting of hydrocarbon carboxylic acid acyl of not more than twelve carbon atoms or a halo-, nitro-, hydroxy-, amino-, cyano-, thiocyano-, and loweralkoxy-hydrocarbon carboxylic acid acyl of not more than twelve carbon atoms, inclusive.

5. A compound selected from the group consisting of the free bases and acid addition salts of a compound of the formula:

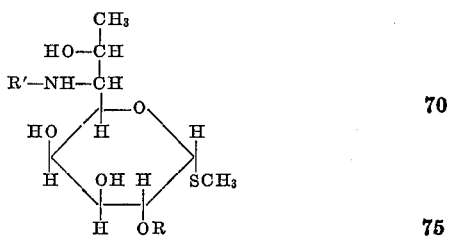

wherein R is acetyl and wherein R' is trans-4-propyl-L-hygroyl.

6. A compound selected from the group consisting of the free bases and acid addition salts of a compound of the formula:

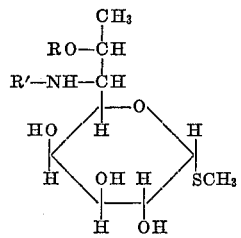

wherein R is acetyl and wherein R' is trans-4-propyl-L-hygroyl.

7. A compound selected from the group consisting of the free bases and acid addition salts of a compound of the formula:

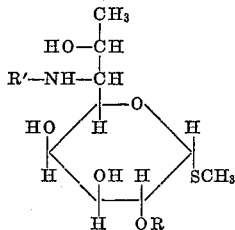

wherein R is benzoyl and wherein R' is trans-4-propyl-L-hygroyl.

8. A compound selected from the group consisting of the free bases and acid addition salts of a compound of the formula:

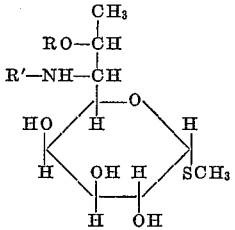

wherein R is benzoyl and wherein R' is trans-4-propyl-L-hygroyl.

9. A compound selected from the group consisting of the free bases and acid addition salts of a compound of the formula:

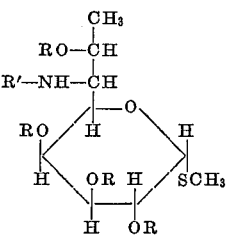

wherein one R is hydrogen and the other R's are selected from the group consisting of a hydrocarbon carboxylic acid acyl radical containing from two to twelve carbon atoms, inclusive, or halo-, nitro-, hydroxy-, amino-, cyano-, thiocyano-, and loweralkoxy hydrocarbon carboxylic acid acyl radical containing from two to twelve carbon atoms, inclusive; and wherein R' is trans-4-propyl-L-hygroyl.

10. A compound selected from the group consisting of the free bases and acid addition salts of a compound of the formula:

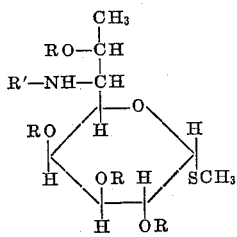

wherein two R's are hydrogen and the other R's are selected from the group consisting of a hydrocarbon carboxylic acid acyl radical containing from two to twelve carbon atoms, inclusive, or halo-, nitro-, hydroxy-, amino-, cyano-, thiocyano-, and loweralkoxy hydrocarbon carboxylic acid acyl radical containing from two to twelve carbon atoms, inclusive; and wherein R' is trans-4-propyl-L-hygroyl.

References Cited

UNITED STATES PATENTS 2,851,463  9/1958  Hinman et al. _____ 260—210

LEWIS GOTTS, *Primary Examiner.*

JOHNNIE R. BROWN, *Assistant Examiner.*

UNITED STATES PATENT OFFICE
CERTIFICATE OF CORRECTION

Patent No. 3,326,891            June 20, 1967

Herman Hoeksema et al.

It is hereby certified that error appears in the above numbered patent requiring correction and that the said Letters Patent should read as corrected below.

Column 9, line 57, for "wherein $R_2$ is" read -- wherein $R'$ is --.

Signed and sealed this 1st day of October 1968.

(SEAL)
Attest:

Edward M. Fletcher, Jr.           EDWARD J. BRENNER
Attesting Officer           Commissioner of Patents